United States Patent
Rees et al.

(10) Patent No.: US 12,172,710 B2
(45) Date of Patent: Dec. 24, 2024

(54) ELECTRIC POWER STEERING SYSTEM

(71) Applicant: ZF Automotive UK Limited, Solihull (GB)

(72) Inventors: Samuel Rees, Birmingham (GB); Maciej Kudanowski, Solihull (GB)

(73) Assignee: ZF AUTOMOTIVE UK LTD., West Midlands (GB)

( * ) Notice: Subject to any disclaimer, the term of this patent is extended or adjusted under 35 U.S.C. 154(b) by 163 days.

(21) Appl. No.: 17/128,475

(22) Filed: Dec. 21, 2020

(65) Prior Publication Data

US 2021/0269088 A1     Sep. 2, 2021

(51) Int. Cl.
   *B62D 5/04*     (2006.01)

(52) U.S. Cl.
   CPC ......... *B62D 5/0496* (2013.01); *B62D 5/0484* (2013.01)

(58) Field of Classification Search
   CPC .. B62D 5/0496; B62D 5/0484; B62D 5/0457; B62D 5/0475; B62D 5/046; G06F 1/206; G06F 3/0679; G06F 8/654; G06F 11/1076; G06F 12/0238; G06F 12/0246; G05B 19/404; G05B 2219/25305; G05B 2219/36109; G05B 2219/14043; G05B 2219/21156; G05B 2219/24205;
   (Continued)

(56) References Cited

U.S. PATENT DOCUMENTS 6,308,121 B1 * 10/2001 Ulm ........................ G06F 11/00
                                                       714/E11.018
6,533,383 B1 * 3/2003 Saruta .................. B41J 2/17546
                                                              347/19
(Continued)

FOREIGN PATENT DOCUMENTS

CN     102681447 A  *  9/2012
EP       1321846 A2    11/2002
(Continued)

OTHER PUBLICATIONS

Machine translation of JP-2001130432-A retrieved from Espacenet on Aug. 10, 2022 (Year: 2022).*

(Continued)

*Primary Examiner* — Thomas Ingram
*Assistant Examiner* — Faris Asim Shaikh
(74) *Attorney, Agent, or Firm* — Tarolli, Sundheim, Covell & Tummino LLP

(57) ABSTRACT

An electric power steering system includes an electric motor configured to provide power to a steering mechanism of a vehicle. A controller operates the electric motor in response to an input. A flash memory device is in communication with the controller. A temperature sensor provides an output indicative of a temperature of a part of the electric power steering system. The controller is configured to power down or prevent power up of the flash memory device if the temperature of the electric power steering system is outside of a predetermined temperature range. A method of operating an electric power steering system includes measuring a temperature of the electric power assisted steering system and switching off a flash memory device of the electric power steering system if the temperature of the electric power steering system is outside of a predetermined temperature range.

20 Claims, 2 Drawing Sheets

(58) Field of Classification Search
CPC ........... G05B 2219/37375; G05B 2219/37429; G05B 2219/37431
See application file for complete search history.

(56) References Cited

U.S. PATENT DOCUMENTS

| | | | | |
|---|---|---|---|---|
| 7,171,582 | B2* | 1/2007 | Henninger | G06F 1/206 |
| | | | | 702/132 |
| 8,972,115 | B1* | 3/2015 | Oh | H02P 29/032 |
| | | | | 318/434 |
| 9,811,267 | B1* | 11/2017 | Yang | G11C 16/26 |
| 10,263,562 | B2* | 4/2019 | Ito | H02P 29/60 |
| 10,534,412 | B2* | 1/2020 | Perchlik | G06F 1/3206 |
| 11,036,413 | B1* | 6/2021 | Sloat | G06F 1/20 |
| 2003/0140265 | A1* | 7/2003 | Henninger | G06F 1/206 |
| | | | | 714/1 |
| 2003/0191889 | A1* | 10/2003 | Forrer, Jr. | G11B 27/36 |
| | | | | 711/112 |
| 2008/0203690 | A1* | 8/2008 | Horiuchi | B60L 15/20 |
| | | | | 318/473 |
| 2014/0118866 | A1* | 5/2014 | Iwami | H02H 7/08 |
| | | | | 361/25 |
| 2016/0009314 | A1* | 1/2016 | Muramatsu | H02P 29/68 |
| | | | | 701/99 |
| 2016/0266826 | A1* | 9/2016 | Ooneda | G11C 29/52 |
| 2018/0335775 | A1* | 11/2018 | Konishi | G05D 1/0061 |

FOREIGN PATENT DOCUMENTS

| | | | | |
|---|---|---|---|---|
| JP | | 2001130432 A | * 5/2001 | |
| JP | | 2003157203 A | * 5/2003 | |
| JP | | 2008273503 A | * 11/2008 | ............... H02H 5/04 |

OTHER PUBLICATIONS

Machine translation of CN-102681447-A retrieved from PE2E Search on Oct. 23, 2023 (Year: 2023).*

Machine translation of CN-102681447-A retrieved from PE2E Search on Jul. 26, 2024 (Year: 2024).*

Machine translation of JP-2008273503-A retrieved from PE2E Search on Jul. 26, 2024 (Year: 2024).*

Machine translation of JP-2003157203-A retrieved from PE2E Search on Jul. 26, 2024 (Year: 2024).*

* cited by examiner

ELECTRIC POWER STEERING SYSTEM

RELATED APPLICATION

This application claims priority from British Application No. 2003004.5, filed Mar. 2, 2020, the subject matter of which is incorporated herein by reference in its entirety.

BACKGROUND OF THE INVENTION

The present invention relates to an electric power steering system, for example for a vehicle, and to a method of operating such an electric power steering system. The invention may more particularly relate to an electric power-assisted steering (EPAS) system with a direct connection from the steering wheel to a road wheel through a steering linkage.

Many electric assistance systems on a vehicle include electronic circuits that are sometimes required to access external memory in order to carry out certain operations. As such, memory devices are commonly used in the control electronics associated with such systems. Flash memory devices are often used for their good read/write characteristics. However, there can be issues with flash memory devices when operating temperatures are at the extremes that are possible within electric power steering systems due to the requirement to locate parts of the system in a relatively hostile part of the vehicle such as an engine bay.

SUMMARY OF THE INVENTION

According to a first aspect, there is provided an electric power steering system comprising:
- an electric motor configured to provide power to a steering mechanism of a vehicle;
- a controller configured to operate the electric motor in response to an input;
- a flash memory device in communication with the controller; and
- a temperature sensor configured to provide an output indicative of a temperature of a part of the electric power steering system;
- characterised in that the controller is configured to power down the flash memory device or to prevent the flash device from powering up if the temperature of the part of the electric power steering system is outside of a predetermined temperature range.

By powering down and powering up the flash memory device we mean removing or applying the power supply voltage to the device. Doing this when the temperature is outside of the predetermined temperature range, the flash memory device can be protected from damage or memory corruption that could otherwise occur. This means that the rated operating temperature of the flash memory device used does not need to be as great as the operating temperature range of the electric power steering system as a whole. A component with a smaller rated operating temperature range can therefore be used, allowing a cost saving whilst not sacrificing the operation of the system.

The controller may be configured to operate the motor during an ignition cycle of the vehicle, and to power up the flash device following the start of the ignition cycle to provide a short duration of time in which a programming operation of the flash device may be performed, the controller powering down the flash device after the programming operation for the remainder of the ignition cycle. This power up will only occur if the temperature of the system is within the predetermined temperature range.

The short duration of time may comprise a few seconds to a few tens of seconds.

The part at which temperature is sensed may comprise the flash memory itself, or a housing for the flash memory or any other part where the temperature measured will enable an indication of the temperature of the flash memory to be determined.

During a start-up operation, the controller may be configured not to power up the flash memory device until the electric power steering system is inside of the predetermined temperature range.

The controller may be configured to power up the flash memory device when the temperature of the electric power steering system returns to the predetermined temperature range.

The controller may be configured to spower up the flash memory device only when a flash operation is requested.

The flash operation may be interrupted and the flash memory device switched off if the electric power steering system leaves the predetermined temperature range during the flash operation.

Damage to the system can therefore be prevented even in the case where the flash memory device begins to function when the temperature is at acceptable levels but then changes to be outside of the predetermined temperature range.

The flash memory device may be switched off once the flash operation is complete.

Powering down the flash memory device once the flash operation is complete removes any possibility of damage from quick changes in temperature whilst a flash operation is not in process.

The predetermined temperature range may include a minimum temperature.

The predetermined temperature range may include a maximum temperature.

The predetermined temperature range may correspond to a rated operating temperature range of the flash memory device.

By correlating the predetermined temperature range with the rated operating temperature of the flash memory device in use in the electric power steering system, flash operations can continue to be requested at all times that the flash memory device is capable of functioning but damage to the flash memory device can be prevented. As such, the system maximises functionality.

According to a second aspect, there is provided a method of operating an electric power steering system, comprising:
- obtaining a measurement of the temperature of a part of the electric power assisted steering system;
- powering down a flash memory device of the electric power steering system if the temperature of the part of the electric power steering system is outside of a predetermined temperature range.

The method may further comprise preventing power up of the flash memory device during a start-up operation until the electric power steering system is inside of the predetermined temperature range.

The method may further comprise powering up the flash memory device if the temperature of the electric power steering system returns to the predetermined temperature range.

The flash memory device may only be powered up when a flash operation is requested.

The method may further comprise interrupting a flash operation and powering down the flash memory device if the electric power system leaves the predetermined temperature range during the flash operation.

The predetermined temperature range may include a minimum temperature.

The predetermined temperature range may include a maximum temperature.

The predetermined temperature range may correspond to a rated operating temperature range of the flash memory device.

BRIEF DESCRIPTION OF THE FIGURES

Specific, non-limiting, embodiments will now be described with reference to the accompanying drawings, in which.

DESCRIPTION

Figure 1:
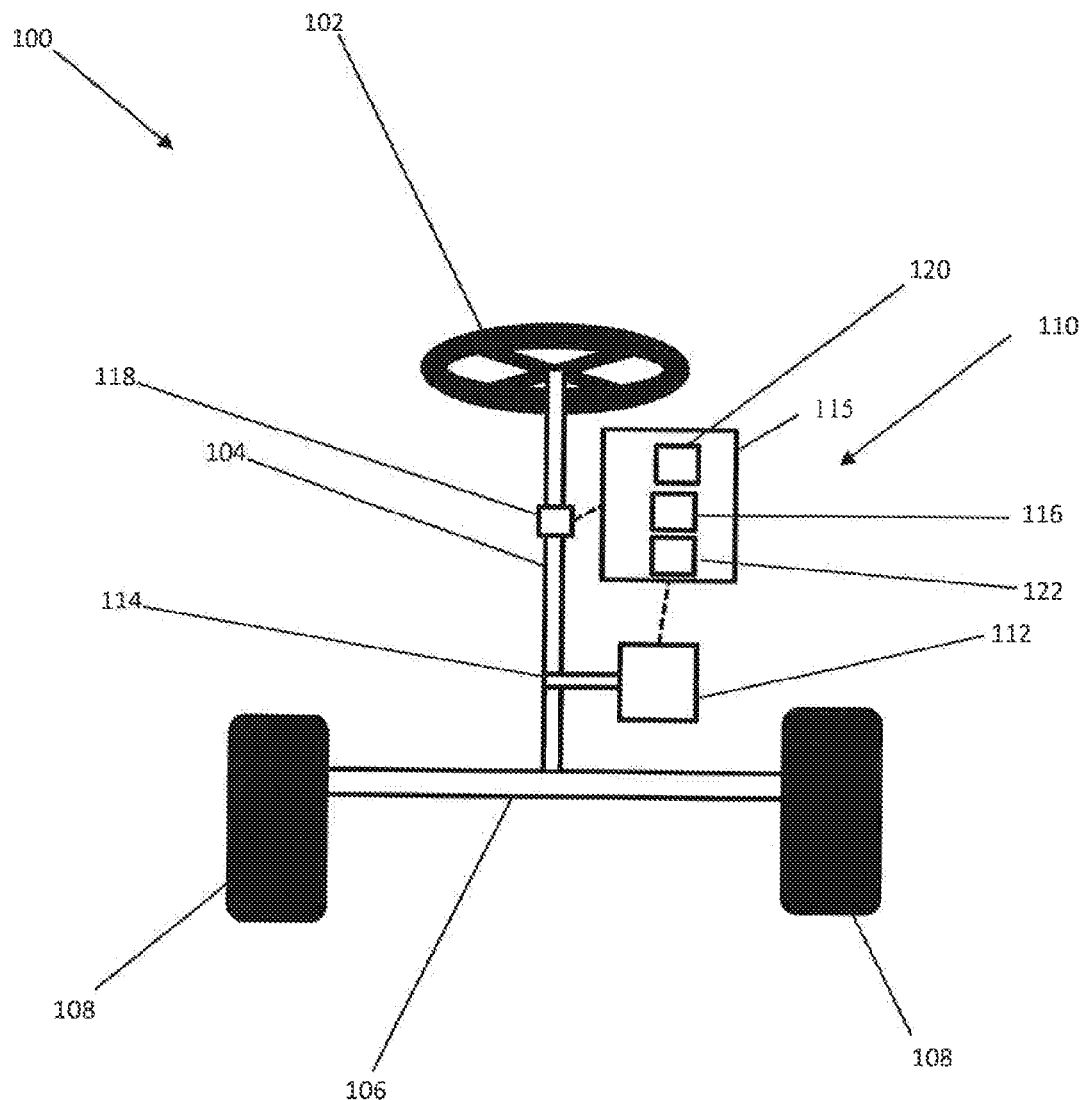
FIG. 1 shows a schematic view of an embodiment of a steering apparatus including an electric power steering system according to the first aspect.

Referring firstly to FIG. 1, there is shown an embodiment of a steering apparatus 100. The steering apparatus 100 includes a hand wheel 102 for receiving steering inputs from a driver. The hand wheel 102 is attached to a shaft 104 that transmits steering inputs to a steering mechanism 106 of a vehicle. The steering mechanism 106, in the present embodiment a rack-and-pinion system, transmits the steering inputs to the road wheels 108 of the vehicle.

An electric power steering system 110 is provided to provide power assistance to the steering inputs delivered by the driver. Power assistance is delivered to a lower portion of the shaft 104 by an electric motor 112 that transmits power via a worm gear 114 that engages with the shaft 104. A electronic control unit 115 that includes a controller 116 receives inputs from a torque sensor 118 higher up the shaft 104 that provides an output indicative of a torque applied by the driver as the steering input. In response, the controller 116 instructs the electric motor 112 to deliver an assistance torque to the shaft 104. A combined driver torque and assistance torque is therefore delivered to the steering mechanism 106 and thus to the road wheels 108 of the vehicle.

Throughout operation of the electric power steering system 110, various information is required to be stored and/or accessed from memory. Flash memory provides good read/write performance for the electric power steering system and therefore a flash memory device 120 is provided in the electric power steering system 110, in communication with the controller 116. Operation requests are issued by the controller 116 to the flash memory device 120 from time-to-time during use of the electric power steering system 110, which cause the flash memory device 120 to carry out operations. Types of operation include read and write and erase operations of data indicative of the steering column angular position or velocity Flash memory devices 120 are rated for operation within a certain temperature range. Outside of such ranges, the flash memory device 120 may malfunction causing memory corruption or loss due to thermal over-stress leading to damage of the semiconductor device. As will be known to the skilled person, electric power steering systems 110 are subject to high temperature fluctuations due to their position in the vehicle. A temperature sensor 122 is therefore provided that outputs temperature data to the controller 116 during use. The temperature sensor 122 in the present embodiment is a physical temperature sensor that is in the vicinity of the controller 116 and flash memory device 120, but it may also be a sensor that estimates a temperature using other information from the operation of the electric power steering system 110.

In order to prevent damage to the flash memory device 120, the controller 116 receives the temperature data from the temperature sensor 122 and compares this to a predetermined temperature range. The predetermined temperature range in the present embodiment is selected to correspond to the rated operating temperature range of the flash memory device 120. The rated operating temperature range, and therefore the predetermined temperature range, is −40° C. to +80° C. In other embodiments, the predetermined temperature range may include an upper limit and/or a lower limit. Moreover, the predetermined temperature range may be different to that of the flash memory device 120. For example, the predetermined temperature range may be smaller than the rated operating temperature range in order to include a safety buffer in the predetermined temperature range.

Figure 2:
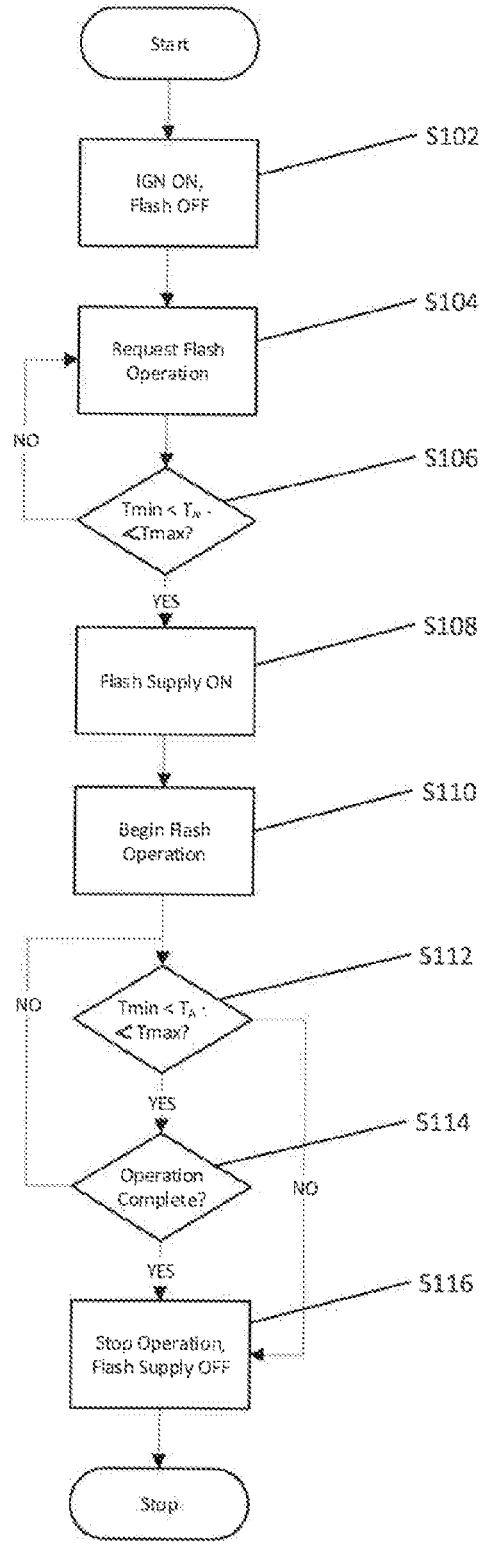
FIG. 2 is an example flow chart of a method according to the second aspect.

The operation of the electric power steering system 110 is shown in FIG. 2.

The controller 116 is configured to switch off the flash memory device 120 when the temperature of the electric power steering system 110 is outside of the predetermined temperature range. By doing this, damage to the flash memory device 120 caused by carrying out operations on the flash memory device 120 at times when its temperature is too high or too low can be prevented.

As well as controlling the switching off of the flash memory device 120, the depicted embodiment checks the temperature of the electric power steering system 110 prior to initiating a flash operation. As such, if the temperature is not within the predetermined temperature range, the flash memory device 120 is not switched on until a time at which the temperature is within the predetermined temperature range.

In addition, the present embodiment does not switch on the flash memory device 120 until such a time as it is required, e.g. when a flash operation is requested by the controller S104. As such, during the start-up operation S102, the flash memory device 120 is switched off and is not switched on until a flash operation is requested, and then is only switched on if the temperature of the electric power steering system 110 is deemed to be within the predetermined temperature range. The flash operation will then not proceed until such a time as the temperature is within the predetermined temperature range S106. The controller 116 may be configured to automatically turn on S108 the flash memory device 120 at any time after the flash operation has been requested once the temperature is within the predetermined temperature range or the controller may wait for a new flash operation request to be issued.

Once the flash memory device is on and a flash operation is being processed S110, the process will continue until such a time as the process is completed S114 or the temperature changes to be outside of the predetermined temperature range S112. Once the flash operation is completed, the flash memory device 120 can be switched off S116 until such a time as another flash operation is requested. If the temperature of the electric power steering system 110 travels outside of the predetermined temperature range, the flash memory device 120 will also be switched off until such a time as a new flash operation is requested.

It will be apparent that, although the described embodiment is that of an electric power steering system including a physical link between the driver and the road wheels, the electric power steering system providing assistance to the driver, the invention is also applicable to electric power steering systems that do not include such a physical link. For example, the invention is applicable to electric power steering systems that operate by drive-by-wire, where only an electrical link is provided between the steering wheels and the driver, or for autonomous steering systems where the control of the steering is provided by computer without any physical driver input.

The invention claimed is:

1. An electric power steering system comprising:
    an electric motor configured to provide power to a steering mechanism of a vehicle;
    a controller configured to operate the electric motor in response to an input;
    a flash memory device in communication with the controller; and
    a temperature sensor configured to provide an output indicative of a temperature of a part of the electric power steering system;
    wherein the controller is configured to power down or prevent power up of the flash memory device when the temperature of the part of the electric power steering system is below a predetermined temperature range, and when the temperature of the part of the electric power steering system is above the predetermined temperature range.

2. An electric power steering system according to claim 1, wherein, when the vehicle is started, the controller is configured not to switch on the flash memory device until the electric power steering system is inside of the predetermined temperature range.

3. An electric power steering system according to claim 1, wherein the controller is configured to switch on the flash memory device if the temperature of the part of the electric power steering system returns to the predetermined temperature range.

4. An electric power steering system according to claim 1, wherein the controller is configured to switch on the flash memory device only when a flash operation is requested.

5. An electric power steering system according to claim 4, wherein the flash operation is interrupted and the flash memory device switched off if the electric power steering system leaves the predetermined temperature range during the flash operation.

6. An electric power steering system according to claim 4, wherein the flash memory device is switched off once the flash operation is complete.

7. An electric power steering system according to claim 1, wherein the predetermined temperature range includes a minimum temperature.

8. An electric power steering system according to claim 1, wherein the predetermined temperature range includes a maximum temperature.

9. An electric power steering system according to claim 1, wherein the predetermined temperature range corresponds to a rated operating temperature range of the flash memory device.

10. An electric power steering system according to claim 1, wherein the predetermined temperature range is −40° C. to 80° C.

11. A method of operating an electric power steering system, comprising:
    measuring a temperature of the electric power assisted steering system; and
    switching off a flash memory device of the electric power steering system when the temperature of the electric power steering system is below a predetermined temperature range, and when the temperature of the part of the electric power steering system is above the predetermined temperature range.

12. A method according to claim 11, further comprising preventing the switching on of the flash memory device from when the vehicle is started until the electric power steering system is inside of the predetermined temperature range.

13. A method according to claim 11, further comprising switching on the flash memory device if the temperature of the electric power steering system returns to the predetermined temperature range.

14. A method according to claim 11, wherein the flash memory device is only switched on when a flash operation is requested.

15. A method according to claim 14, further comprising interrupting a flash operation and switching off the flash memory device if the electric power steering system leaves the predetermined temperature range during the flash operation.

16. A method according to claim 14, further comprising switching off the flash memory device when the flash operation is complete.

17. A method according to claim 11, wherein the predetermined temperature range includes a minimum temperature.

18. A method according to claim 11, wherein the predetermined temperature range includes a maximum temperature.

19. A method according to claim 11, wherein the predetermined temperature range corresponds to a rated operating temperature range of the flash memory device.

20. An electric power steering system, comprising:
    an electric motor configured to provide power to a steering mechanism of a vehicle;
    a controller configured to operate the electric motor in response to an input;
    a flash memory device in communication with the controller; and
    a temperature sensor configured to provide an output indicative of a temperature of a part of the electric power steering system;
    wherein the controller is configured to power down or prevent power up of the flash memory device if the temperature of the part of the electric power steering system is outside of a predetermined temperature range; and
    wherein when the vehicle is started, the controller is configured not to switch on the flash memory device until the part of the electric power steering system is inside of the predetermined temperature range.

* * * * *